(12) United States Patent
Miyauchi

(10) Patent No.: US 12,423,350 B2
(45) Date of Patent: Sep. 23, 2025

(54) IMAGE PROCESSING APPARATUS DERIVING CONDITION FOR ESTIMATING TEXT BLOCK, IMAGE PROCESSING METHOD, AND STORAGE MEDIUM

(71) Applicant: CANON KABUSHIKI KAISHA, Tokyo (JP)

(72) Inventor: Takashi Miyauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 18/170,507

(22) Filed: Feb. 16, 2023

(65) Prior Publication Data
US 2023/0273952 A1    Aug. 31, 2023

(30) Foreign Application Priority Data
Feb. 25, 2022    (JP) .................. 2022-028314

(51) Int. Cl.
*G06F 16/583*    (2019.01)
*G06F 16/903*    (2019.01)
*G06V 30/10*    (2022.01)

(52) U.S. Cl.
CPC .... *G06F 16/5846* (2019.01); *G06F 16/90344* (2019.01); *G06V 30/10* (2022.01)

(58) Field of Classification Search
None
See application file for complete search history.

(56) References Cited

U.S. PATENT DOCUMENTS

| | | | |
|---|---|---|---|
| 2019/0266397 A1* | 8/2019 | Arakawa | G06V 30/412 |
| 2020/0234073 A1 | 7/2020 | Kobayashi et al. | G06K 9/344 |
| 2021/0286991 A1* | 9/2021 | Miyauchi | G06F 18/22 |
| 2022/0327850 A1 | 10/2022 | Miyauchi | G06V 30/412 |

FOREIGN PATENT DOCUMENTS

JP    2020-119152    8/2020

* cited by examiner

*Primary Examiner* — Andrew H Lam
(74) *Attorney, Agent, or Firm* — Venable LLP

(57) ABSTRACT

To make it possible to extract a value with a high accuracy without imposing a heavy burden on a user even in a case where the character string row of a value corresponding to a certain item within a document changes. Based on a value extraction rule of a registered document whose type is the same as that of an input document, a text block corresponding to a value is estimated from among text blocks included in the scanned image of the input document and the character string that is the value is extracted. Then, after a user modifies the text block corresponding to the extracted character string, a rule is derived for estimating a value block so that it is possible to estimate the modified text block as the text block corresponding to the value.

12 Claims, 16 Drawing Sheets

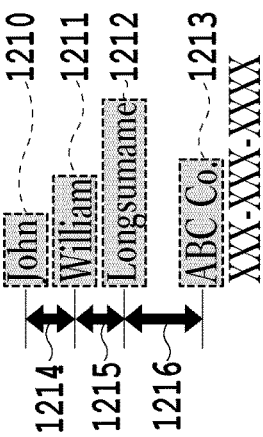
FIG. 12C
FIG. 12B
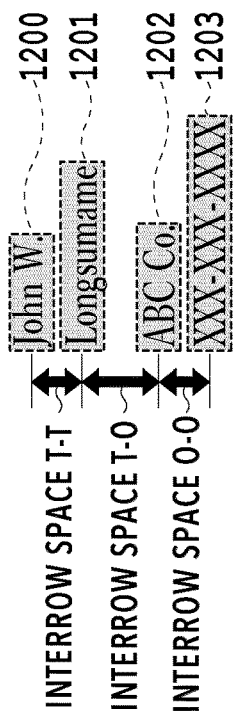
FIG. 12A

John W. —1500
Longsurname —1501
ABC Co. —1502
XXX-XXX-XXXX

FIG.15A

John Short —1503
ABC Co. —1504
XXX-XXX-XXXX

FIG.15B

John —1505
William —1506
Longsurname —1507
ABC Co. —1508
XXX-XXX-XXXX

FIG.15C

IMAGE PROCESSING APPARATUS DERIVING CONDITION FOR ESTIMATING TEXT BLOCK, IMAGE PROCESSING METHOD, AND STORAGE MEDIUM

BACKGROUND

Field

The present disclosure relates to a technique to extract a character string corresponding to a specific item from a document.

Description of the Related Art

There is a technique to extract a character string (called "value") corresponding to a desired item within a document, for example, such as the title and the company name, from a scanned image obtained by scanning a document, such as a business form. In order to extract a value corresponding to a specific item from a scanned image of a document, it is necessary to set and register in advance a value extraction area for each type of document. Then, generally, a value is obtained by determining which already-registered document (in the following, described as "registered document") an input-target document matches and performing OCR processing partially while referring to the value extraction area of the matched registered document. Here, in a business form, such as an estimate form and a bill, there is a case where even a single value is described across a plurality of rows and the number of rows is not determined depending on the position at which the character string that is a value is described (layout) or the number of character strings to be described. In this regard, Japanese Patent Laid-Open No. 2020-119152 has disclosed a technique to determine the number of rows of a value by sequentially referring to a character string row along the extraction direction and in accordance with a rule determined in advance, such as that reference is continued until a blank row or a specific keyword is found, or until the position or the character attribute of the top character changes.

With the technique of Japanese Patent Laid-Open No. 2020-119152 described above, it is necessary to set in advance a rule for determining the number of character string rows for each value and further, it is necessary for a user to perform in advance the task such as this for each document. However, the task such as this requires much time and effort of a user and the burden of the user is great.

SUMMARY

The technique of the present disclosure has been made in view of the problems as described above and an object is to make it possible to extract a value with a high accuracy without imposing a heavy burden on a user even in a case where the character string row of a value corresponding to a certain item within a document changes. The image processing apparatus according to the present disclosure is an image processing apparatus including: one or more memories storing instructions; and one or more processors executing the instructions to: obtain a scanned image obtained by scanning an input document; extract a character string by estimating a text block corresponding to the character string from among text blocks included in the scanned image based on a rule of a registered document whose type is the same as that of the input document, which is included in information in which the rule for extracting a character string corresponding to a specific item within a document is registered for each type of document; receive modification by a user for the text block corresponding to the extracted character string; and derive a condition for the estimation capable of estimating contents after the modification as a text block corresponding to the character string.

Further features of the present disclosure will become apparent from the following description of exemplary embodiments with reference to the attached drawings.

BRIEF DESCRIPTION OF THE DRAWINGS

FIG. 8A and FIG. 8B are each a diagram showing an example of a check/modification screen;

FIG. 11A to FIG. 11E are each a diagram explaining a specific example of obtaining a value block estimation condition;

FIG. 12A to FIG. 12C are each a diagram showing a specific example of a row determination condition that utilizes an interrow space distance;

FIG. 15A to FIG. 15C are each a diagram showing a specific example of a row determination condition that utilizes estimation results of a first row position of a value of another item.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

Figure 1:
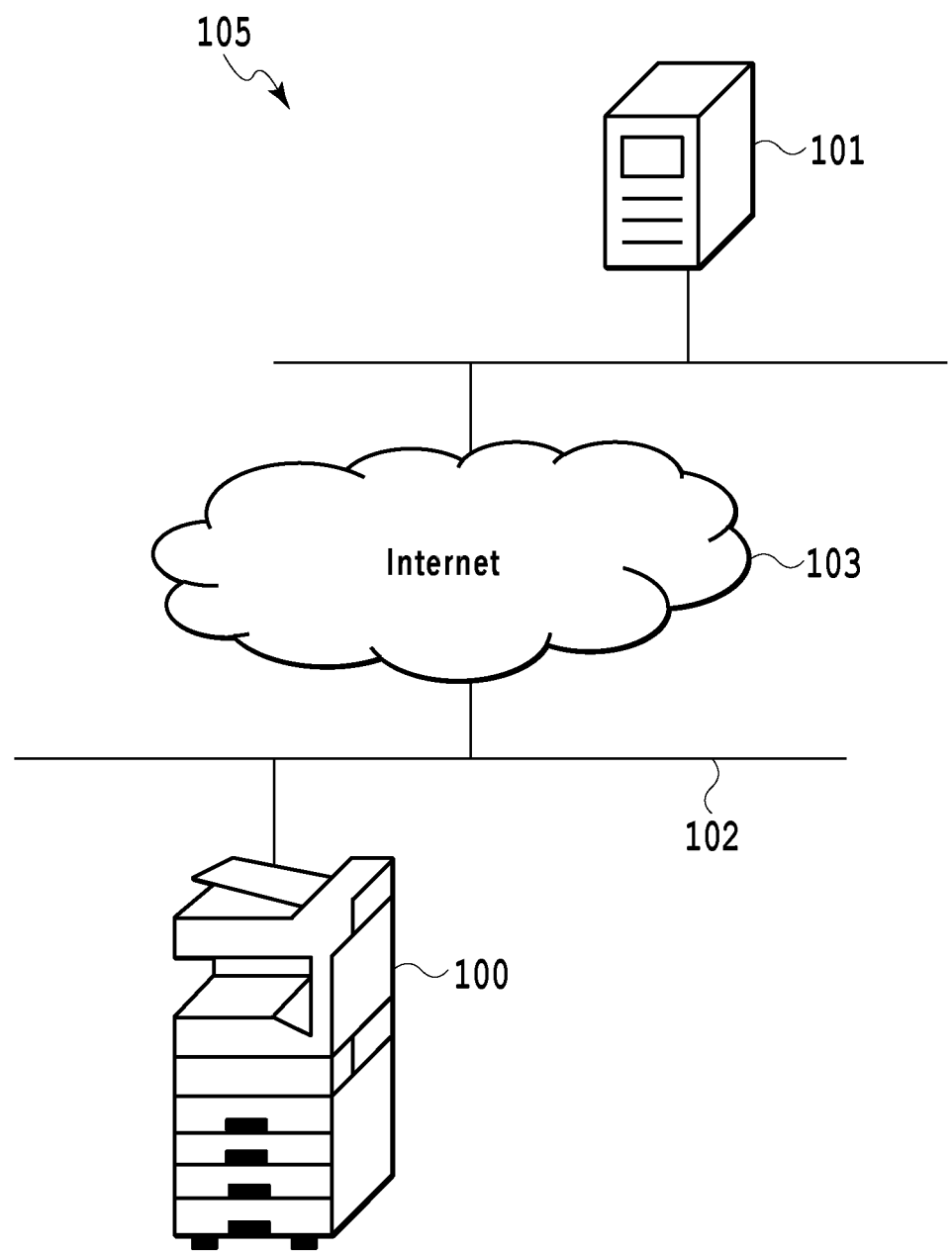
FIG. 1 is a diagram showing a configuration example of a system.

<System Configuration>
FIG. 1 is a diagram showing the general configuration of a system to which the present embodiment can be applied. A system 105 of the present embodiment has an image forming apparatus 100 and a terminal 101. As shown in FIG.

1, the image forming apparatus 100 is connected to a LAN 102 and capable of communicating with the terminal 101 and the like, such as a PC, via Internet 103 and the like. In the present embodiment, the terminal 101 may be omitted and a configuration having only the image forming apparatus 100 may be accepted.

The image forming apparatus 100 is a multi function peripheral (MFP) having the print function, the scan function, the storage saving function and the like. That is, it is possible to utilize the image forming apparatus 100 as a scan terminal that scans a document, such as a business form.

<Hardware Configuration of Image Forming Apparatus>

Figure 2:
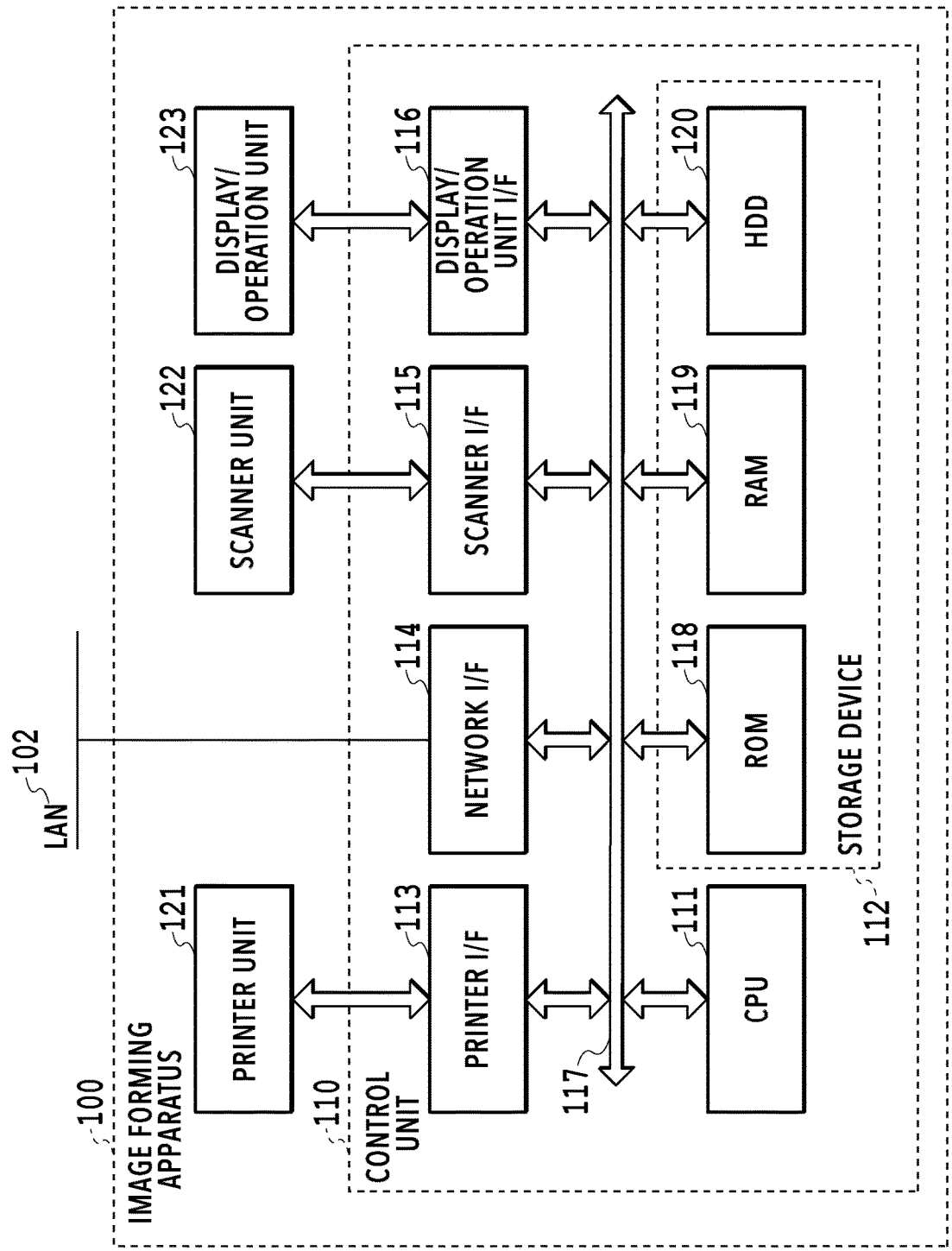
FIG. 2 is a diagram showing a hardware configuration example of an image forming apparatus.

FIG. 2 is a block diagram showing the hardware configuration of the image forming apparatus 100. The image forming apparatus 100 of the present embodiment has a display/operation unit 123, a scanner unit 122, a printer unit 121, and a control unit 110.

The control unit 110 has a CPU 111, a storage device 112 (ROM 118, RAM 119, HDD 120), a printer I/F (interface) 113, a network I/F 114, a scanner I/F 115, and a display/operation I/F 116. Further, in the control unit 110, each of these units is connected to one another via a system bus 117 so as to be capable of communication. The control unit 110 controls the operation of the entire image forming apparatus 100.

The CPU 111 functions as a unit configured to perform each piece of processing, such as reading control, image processing, and display control, in a flowchart, to be described later, by reading and executing control programs stored in the storage device 112.

The storage device 112 stores and retains control programs, image data, metadata, setting data, processing result data and the like. The storage device 112 includes the ROM 118, which is a nonvolatile memory, the RAM 119, which is a volatile memory, the HDD 120, which is a large-capacity storage area, and the like. The ROM 118 is a nonvolatile memory that retains computer programs and the like. The CPU 111 reads a control program, loads the control program onto the RAM 119, and executes the control program. The RAM 119 is a volatile memory that is used as a temporary storage area, such as a main memory and a work area, of the CPU 111.

The network I/F 114 connects the control unit 110 (image forming apparatus 100) to the LAN 102 via the system bus 117. The network I/F 114 transmits image data to an external device on the LAN 102, receives various kinds of information from an external device (not shown schematically) on the LAN 102, and so on.

The scanner I/F 115 connects the scanner unit 122 and the control unit 110 via the system bus 117. The scanner unit 122 generates scanned image data by reading a document and inputs the scanned image data to the control unit 100 via the scanner I/F 115. The scanner unit 122 comprises a document feeder, not shown schematically, and makes it possible to feed one by one and continuously read a plurality of business forms and the like placed on the tray.

The display/operation I/F 116 connects the display/operation unit 123 and the control unit 100 via the system bus 117. The display/operation unit 123 includes a liquid crystal display having a touch panel function, a hard button and the like. Then, the display/operation unit 123 provides user interfaces, such as receiving instructions from a user and recommending a file name and a saving destination for scanned image data obtained by reading a document, such as a business form, by the scan function.

The printer I/F 113 connects the printer unit 121 and the control unit 110 via the system bus 117. The printer unit 121 performs processing to receive print image data generated by the CPU 111 via the printer I/F 113 and print it on a printing medium, such as paper.

<Function Configuration of Image Forming Apparatus>

Figure 3:
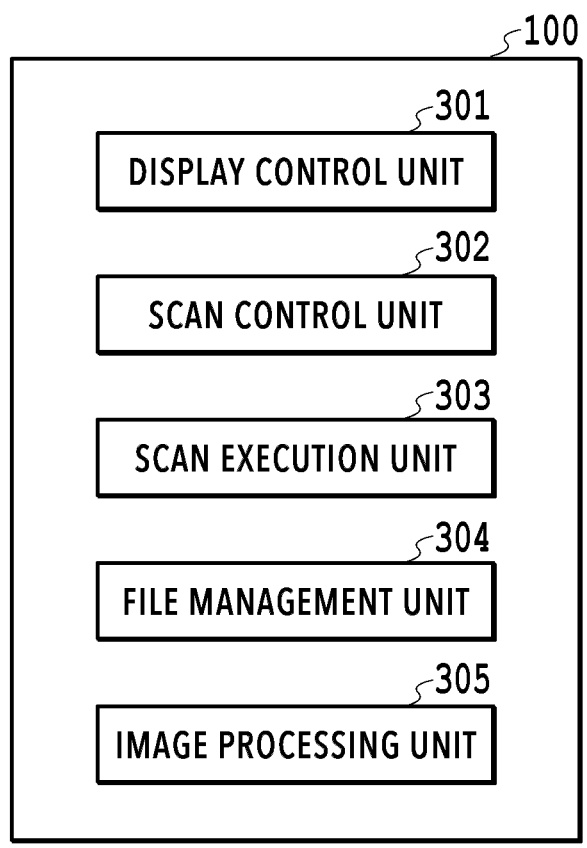
FIG. 3 is a diagram showing a function configuration of the image forming apparatus.

FIG. 3 is a block diagram showing the function configuration (software configuration) of the image forming apparatus 100. In FIG. 3, among various functions of the image forming apparatus 100, the functions narrowed to those relating to the processing from scanning and computerizing (filing) a document up to saving the results are shown.

A display control unit 301 displays a user interface screen (UI screen) for receiving various user operations on the touch panel of the display/operation unit 123. The various user operations include, for example, scan setting, instructions to start scan, instructions to modify value, instructions for registration method of reference document, file name setting, instructions to save file and the like.

A scan control unit 302 instructs a scan execution unit 303 to perform scan processing in accordance with a user operation (for example, pressing down of "Start scan" button) performed on the UI screen. In the instructions to perform scan processing, information on scan setting is also included. The scan execution unit 303 generates scanned image data by causing the scanner unit 122 to perform the reading operation of a document via the scanner I/F 115 in accordance with the instructions to perform scan processing from the scan control unit 302. The generated scanned image data is saved in the HDD 120 by a file management unit 304.

An image processing unit 305 performs image modification processing, such as rotation and inclination correction, in addition to image analysis processing, such as text block detection processing, OCR processing (character recognition processing), and document similarity determination processing, for the scanned image data. With the image processing unit 305, the image forming apparatus 100 also functions as an image processing apparatus. The character string area that is detected from the scanned image is also called "text block". Details of each piece of processing that is performed by the image processing unit 305 will be described later.

The function of each unit described above shown in FIG. 3 is implemented by the CPU 111 of the image forming apparatus 100 loading a program code stored in the ROM 118 onto the RAM 119 and executing the program code. Alternatively, it may also be possible to implement part or all of the functions of each unit in FIG. 3 by hardware, such as an ASIC and an electronic circuit.

<Filing of Scanned Image>

Figure 4:
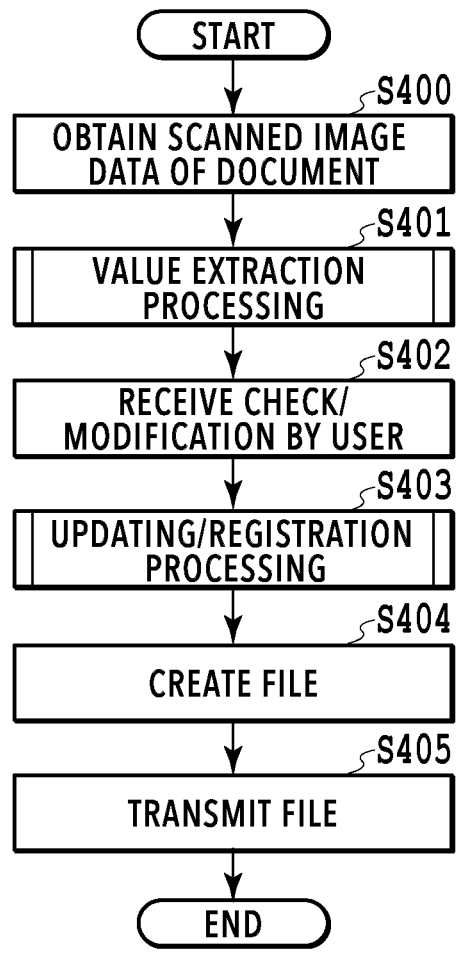
FIG. 4 is a flowchart showing a flow of processing to file a scanned image.

Following the above, the series of processing from filing the scanned image of an input document until outputting the file is explained with reference to the flowchart in FIG. 4. Here, explanation is given by taking a case as an example where one business form is filed as an input document. In the following explanation, symbol "S" means a step and this also applies to the subsequent flowcharts.

At S400, upon receipt of scan instructions via the display/operation unit 123, the scan control unit 302 causes the scan execution unit 303 to perform reading (scan processing) of a business form that is set in a document feeder. Then, the scan control unit 302 obtains image data (scanned image data), which is the results of the scan processing by the scan execution unit 303. The scanned image that is obtained here is an image of each page.

At S401, the image processing unit 305 analyzes the scanned image obtained at S400 and performs processing (value extraction processing) to extract the value, which is the character string corresponding to a predetermined item included in the scan-target input document, based on the value extraction rule. The extraction-target "value" corresponds to the character string of the item that is described at a predetermined position within the document, for example, such as the title that is frequently described at the upper center of the document, the management number and the company name, which are frequently described at the upper left end or at the right end of the document. In the present embodiment, the extracted value is used as a file name at the time of saving the scanned image and as metadata that is embedded in the file. However, the use of the value is not limited to the file name and metadata and for example, the value may be used for setting another piece of property information, for example, such as a folder path. That is, the file name and metadata are a kind of information that is set as the property relating to scanned image data. Details of the value extraction processing at this step will be described later by using FIG. 5.

At S402, the display control unit 301 displays a UI screen (check/modification screen) for causing a user to check/modify the file name and metadata automatically generated by using the value extracted as S401. Then, the display control unit 301 receives instructions of a user for the file name and metadata recommended via this check/modification screen. That is, a user checks the file name and metadata displayed on the check/modification screen and modifies them as needed. The display control unit 301 receives instructions of a user, such as the determination operation by a user (for example, pressing down of "OK" button) or the modification operation for the file name and (value included in) metadata. In a case where no value is extracted at S401, the file name and metadata are not recommended to a user. In this case, the display control unit 301 displays a UI screen (not shown schematically) prompting a user to input a file name and metadata and receives the input operation of a user. In this manner, the file name and metadata (in a case where they are modified, the modified file name and metadata) automatically generated based on the extracted value are determined as the file name and metadata of the scanned image of the input document. Details of the reception of the check/modification by a user for the recommended file name and the like will be described later.

At S403, the image processing unit 305 performs processing (updating/registration processing) to update the value extraction rule for the input document or newly register a value extraction rule for the input document. Details of the updating/registration processing will be described later.

At S404, the image processing unit 305 files the scanned image data obtained at S400 and sets the file name determined at S402 to the filed scanned image data. In the present embodiment, explanation is given on the assumption that, as an example, the image processing unit 305 files the scanned image data in the PDF (Portable Document Format) format and saves the filed scanned image. In a case of PDF, it is possible to save the scanned image data for each page and for example, in a case where a plurality of business forms is scanned en bloc at S400, the scanned image of each business form is saved in one file as a separate page.

At S405, the file management unit 304 outputs the file created at S404 to the destination designated by a user. For example, in a case of saving the file in a specific storage server (not shown schematically) by the storage saving function, the file management unit 304 transmits the file to a predetermined storage server through the LAN 102.

The above is the contents of the series of processing from filing the scanned image of the input document until outputting the file. In the present embodiment, explanation is given on the assumption that the image forming apparatus 100 single-handedly performs the processing at each step in the flowchart in FIG. 4. However, the present disclosure is not limited to this. For example, it may also be possible to perform all or part of the processing shown in the flow in FIG. 4 by another image processing apparatus (not show schematically) on the system 105, which has the functions in FIG. 3. Specifically, the configuration may be such that the scan processing is performed in the image forming apparatus 100 and the obtained scanned image is transmitted to the terminal 101 via the network, and then the value extraction processing is performed at the terminal 101 having the same functions as those of the image processing unit 305. In this case, the terminal 101 returns the value extraction results to the image forming apparatus 100 and the image forming apparatus 100 performs the file generation and file transmission based on the obtained value extraction results.

<Value Extraction Processing>

Figure 5:
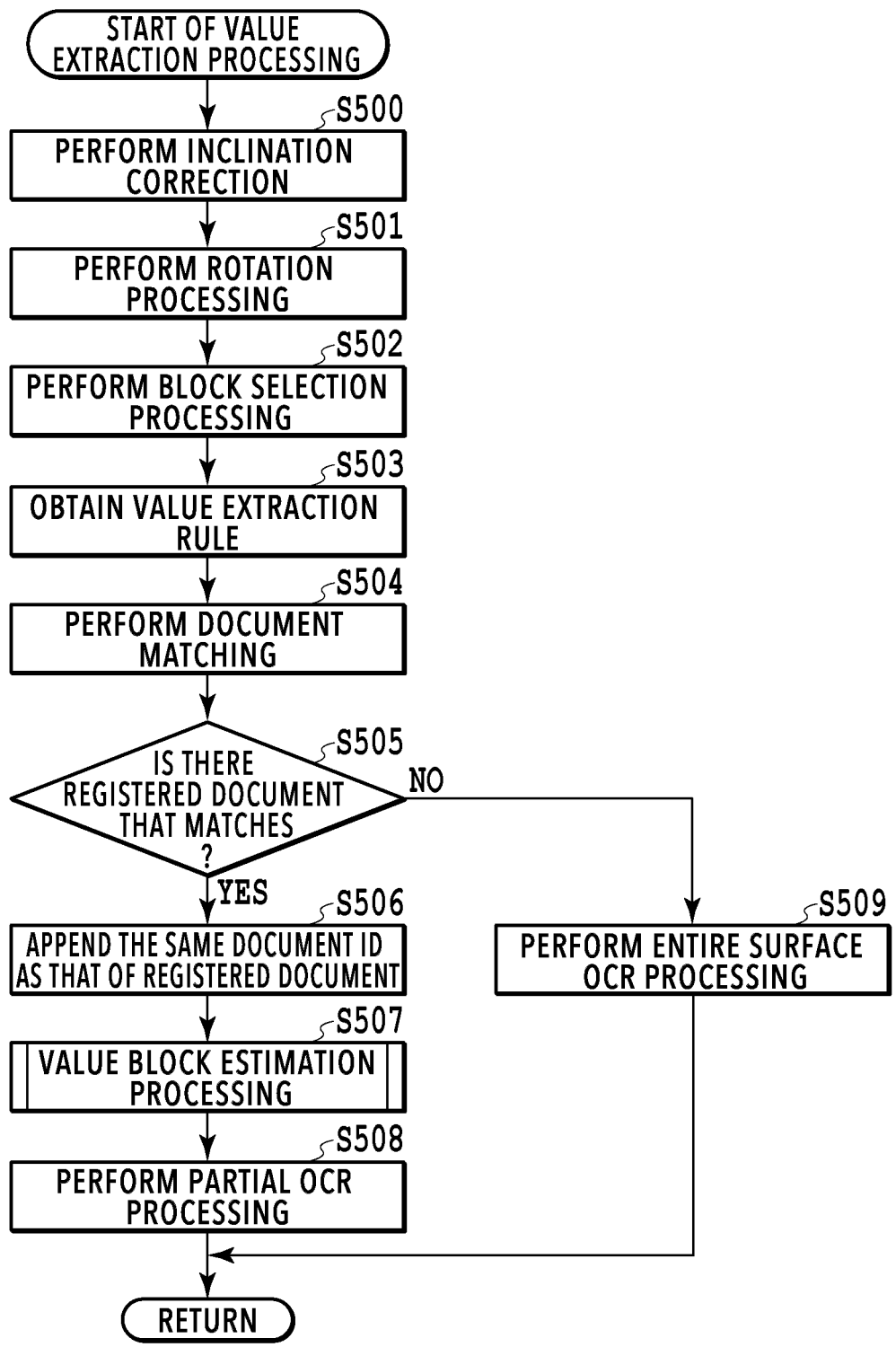
FIG. 5 is a flowchart showing details of value extraction processing.

Following the above, with reference to the flowchart in FIG. 5, details of the value extraction processing (S401) by the image processing unit 305 are explained. In the value extraction processing, for the scanned image of the input document, the correction of orientation is performed and the type of the input document is identified and the value extraction in accordance with the identified type of document (document type) is performed.

At S500, the processing to correct the inclination of the scanned image of the input document is performed. Specifically, processing to detect the angle of the inclination of the scanned image and incline the image in the opposite direction by an amount corresponding to the detected angle of the inclination is performed. Here, the inclination of the scanned image occurs because, for example, the document is not read straight due to the wear of the roller within the document feeder at the time of scan or the document is not printed straight at the time of printing. At the time of detecting the angle of the inclination, first the object included within the scanned image is detected and the objects adjacent to each other in the horizontal direction or in the vertical direction are concatenated. Then, the inclination is found by deriving how the angle formed by the straight lines connecting the center positions of the cluster of the concatenated objects is inclined from the horizontal direction or the vertical direction. The inclination detection method described here is an example and in addition to the method described above, it may also be possible to find the angle as the angle of inclination, at which, in a case where the coordinates of the center of each object included within the scanned image are rotated in units of 0.1 degrees, the ratio in which the rotated coordinates of each center are arranged in the horizontal direction or in the vertical direction is the highest. By correcting the inclination of the scanned image, it is possible to improve the processing accuracy of each of rotation correction, block selection, and OCR, which are performed after this.

At S501, processing to rotate the scanned image in units of 90 degrees so that the character within the image becomes erect is performed for the scanned image obtained at S500 for which the inclination correction has been performed. In this rotation processing, first, four images (reference image, image obtained by rotating the reference image by 90 degrees, image obtained by rotating the reference image by 180 degrees, image obtained by rotating the reference image by 270 degrees) are prepared, which are obtained by rotating the reference image, which is the scanned image for which the inclination correction has been performed, in units of 90 degrees. Then, there is a method of taking the image as the image for which the rotation processing has been performed, whose number of characters that can be recognized with a confidence score equal to or higher than a predetermined score is the largest by performing simple OCR processing for each image. It is assumed that the scanned image that is the processing target at the subsequent steps refers to the scanned image for which the inclination correction and the rotation processing have been performed unless stated particularly.

Figures 6A, 6B:
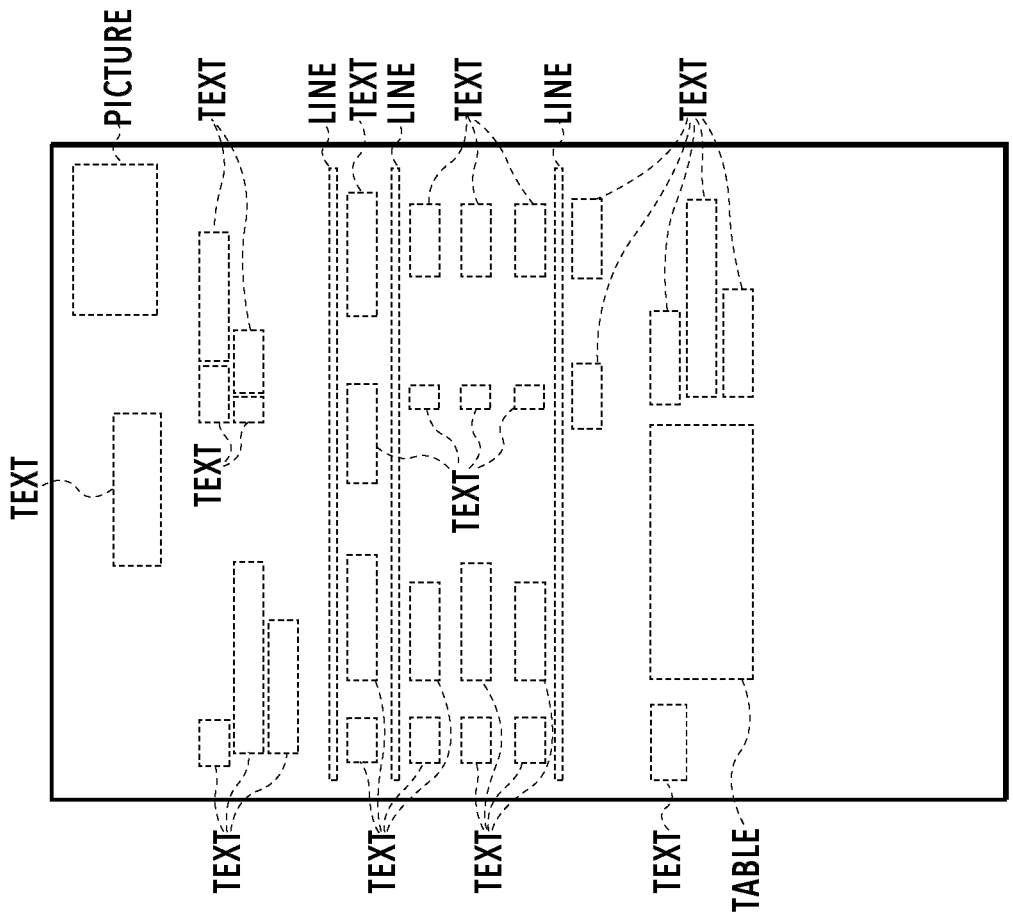
FIG. 6A and FIG. 6B are each an explanatory diagram of block selection processing.

At S502, block selection processing is performed for the processing-target scanned image. The block selection processing is processing to extract only the area (text) corresponding to a character by dividing the foreground area into the area corresponding to a character and the area corresponding to other than a character after classifying an image into the foreground area and the background area. Specifically, first a cluster of pixels surrounded by a black pixel contour is extracted by performing contour tracing for the scanned image binarized into white and black. Then, for the black pixel cluster whose area is larger than a predetermined area, the contour tracing is performed also for the white pixels located inside thereof to extract a white pixel cluster and further, from the inside of the white pixel cluster whose area is larger than or equal to a predetermined area, a black pixel cluster is extracted recursively. The black pixel cluster thus obtained is determined to be the foreground area. The determined foreground area is classified according to size and shape and classified into the area having a different attribute. For example, the foreground area whose aspect ratio is close to 1 and whose size is in a predetermined range is determined to be a pixel cluster corresponding to a character and further, the area in which characters close to one another can be grouped in an aligned manner is determined to be the area (TEXT) of a character string. A flat pixel cluster is determined to be the line area (LINE). The range occupied by a black pixel cluster containing a rectangular white pixel cluster whose size is larger than or equal to a predetermined size in an aligned manner is determined to be the table area (TABLE). The area in which irregularly shaped pixel clusters are dispersed is determined to be the photo area (PHOTO). Then, the pixel cluster whose shape is other than those described above is determined to be the picture area (PICTURE). From among the areas divided for each attribute of the object, the foreground area (TEXT) determined to have the character attribute is detected as a text block. FIG. 6A and FIG. 6B are each a diagram explaining the block selection processing. FIG. 6A shows a scanned image of a business form (here, estimate form) as an input document and FIG. 6B shows the results of the block selection processing for the scanned image shown in FIG. 6A. In FIG. 6B, the rectangle indicated by a dotted line represents the foreground area and indicates the attribute determined for each foreground area. The information (information indicating attribute and position and size of each block) on each text block extracted at this step is used for subsequent document matching (similarity calculation), OCR processing and the like. In the block selection processing at this step, only the text block is extracted. The reason is that the position of a character string well represents the document structure and is closely related to the value information. Consequently, it is not intended to exclude the information on the block determined to have another attribute, such as the photo area and the table area, from utilization at the subsequent steps.

Figure 7:
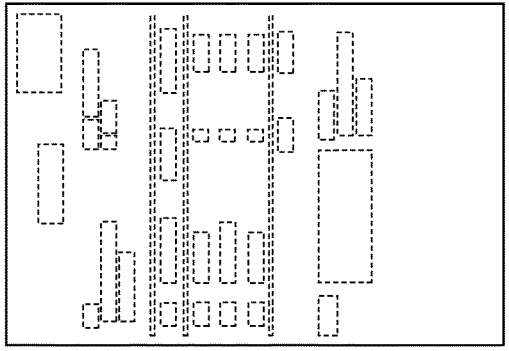
FIG. 7 is a diagram showing an example of a table storing a value extraction rule.

At S503, the value extraction rule is obtained. Specifically, a table storing the value extraction rule created and saved in advance in the HDD 120 and the like by a user is read and loaded onto the RAM 119. FIG. 7 is a diagram showing an example of a table storing the value extraction rule (in the following, described as "rule table"). In a case of the rule table shown in FIG. 7, five of "Document ID", "Registered Name", "Document Image", "Document Identification Information", and "Value Information" are specified and data of each is associated for each record (for each row). The rule table retains records corresponding to the number of registered documents. "Document ID" is a unique ID representing the type of document and here, a four-digit number "0001" is input and by this, the value extraction rule associated with the registered document is identified. "Registered Name" is the name of the registered document and here, "Estimate form_ABC" is input. In "Document Image", image data (for example, image information, such as JEPG) of the registered document is input. The image data that is retained here is only required to retain information allowing a user to grasp the contents of the registered document and for example, it may also be possible to reduce the resolution to about 150 dpi. In "Document Identification Information", information on the position and size of a text block obtained as a result of performing the block selection processing for the image data that is retained as "Document Image" is input. This document identification information is used for document matching, to be described later. The document identification information is not limited to the information on the position and size of a text block and may be information on the position and shape of a ruled line included within the document, or may be information on a combination of character strings existing within the document. "Value Information" is information for extracting a "value", which is a character string corresponding to a specific item, from the registered document. The extracted value is utilized at the time of generating a file name and metadata to be recommended to a user. Here, in "Value Information", information on 'File name' indicating the configuration of the file name and information on 'Metadata' indicating the configuration of metadata are included. In the example in FIG. 7, it is indicated that a file name is generated by connecting three values with underscores, which correspond to an item name {title} representing a title, an item name {sender} representing an issuing company name, and an item name {number} representing a business form number. Further, it is indicated that a value corresponding to an item name {person} representing a person in charge is used as metadata. That is, it is possible to generate a file name and metadata to be recommended to a user by extracting values corresponding to specific items that are set in advance. Further, "Value Information" includes information on the coordinates and size of each text block within the registered document for each value. In the example in FIG. 7, the information on the position and size of the text block (in the following, called "value block") corresponding to a specific item in the registered document is indicated in 'Item name and corresponding block'. Further, in "Value Information", the rule for estimating the row configuration of the value block is indicated as 'Value block estimation condition'. Even in a case where documents have the same type (documents of the same type), the position and the number of rows of the character string row of the value may vary, but 'Value block estimation condition' enables estimation of the row configuration of the value block in the scanned image of the input document. The obtaining method of a value block estimation condition will be described later. In the present embodiment, the example is shown in which the extracted value is utilized for the generation of a file name and metadata, but for example, it may also be possible to utilize the extracted value for the generation of another piece of property information, such as a folder path indicating the transmission destination of a file. In that case also, the property information generated by using the value is recommended to a user and is set to the file of the scanned image. Further, the specific item for extracting a value is not limited to the title, issuing company name, business form number, or total amount. Furthermore, the data format in which the value extraction rule is retained is not limited to the table format.

At S504, document matching processing is performed for the processing-target scanned image. In the document matching processing, whether there is a document whose type is the same as that of the scanned input image among the registered documents within the rule table obtained at S503. A specific procedure is as follows. First, the scanned image of the input document and each document image (registered document image) registered in the rule table are compared in a one-to-one manner and a degree (degree of similarity) indicating to what extent the shapes and the arrangements of the text blocks included within both the images are similar is calculated. In calculating the degree of similarity, positioning is performed between the whole of the text blocks of the scanned image and the whole of the text blocks of the registered document image to be compared. Then, the square of the sum total of the areas in which each text block of the scanned image and each text block of the registered document image overlap is found (referred to as "result A"). Further, the product of the sum total of the areas of the text blocks of the scanned image and the sum total of the areas of the text blocks of the registered document image is found (referred to as "result B"). Then, the result of dividing "result A" by "result B" is taken as the degree of similarity. The calculation of the degree of similarity such as this is performed between the scanned image and all the registered document images within the rule table. Then, among the registered document images having a degree of similarity higher than or equal to a predetermined value, the document (registered document) associated with the registered document image whose degree of similarity is the highest is identified as the document whose type is the same as that of the scanned input document. In a case where the registered document image having a degree of similarity higher than or equal to the predetermined value is not found, it is determined that the registered document whose type is the same as that of the input document does not exist in the rule table.

At S505, the next processing is divided in accordance with whether the registered document that matches the input document (that is, the document of the same type) is found as the result of the document matching processing. In a case where the registered document that matches the input document is found, the processing advances to S506 and in a case where the registered document that matches the input document is not found, the processing advances to S509.

At S506, the same document ID as the document ID that is appended to the registered document identified as the same type as that of the input document is appended to the scanned image of the input document. At S507 that follows, processing (value block estimation processing) to estimate the text block corresponding to the extraction-target value is performed for each specific item for the processing-target scanned image. Details of the value block estimation processing will be described later.

At S508, OCR processing for the value block of each item estimated at S507, that is partial OCR processing that takes only part of the text blocks within the input document as a target, not all the text blocks, is performed. Due to this, the character string corresponding to each specific item is extracted as a value.

At S509, OCR processing for the entire surface of the processing-target scanned image, that is, entire surface OCR processing that takes all the text blocks within the input document as a target is performed. Due to this, each character string corresponding to all the text blocks within the input document is obtained. The above is the contents of the value extraction processing.

<Reception of Check/Modification>

Figures 8A, 8B:
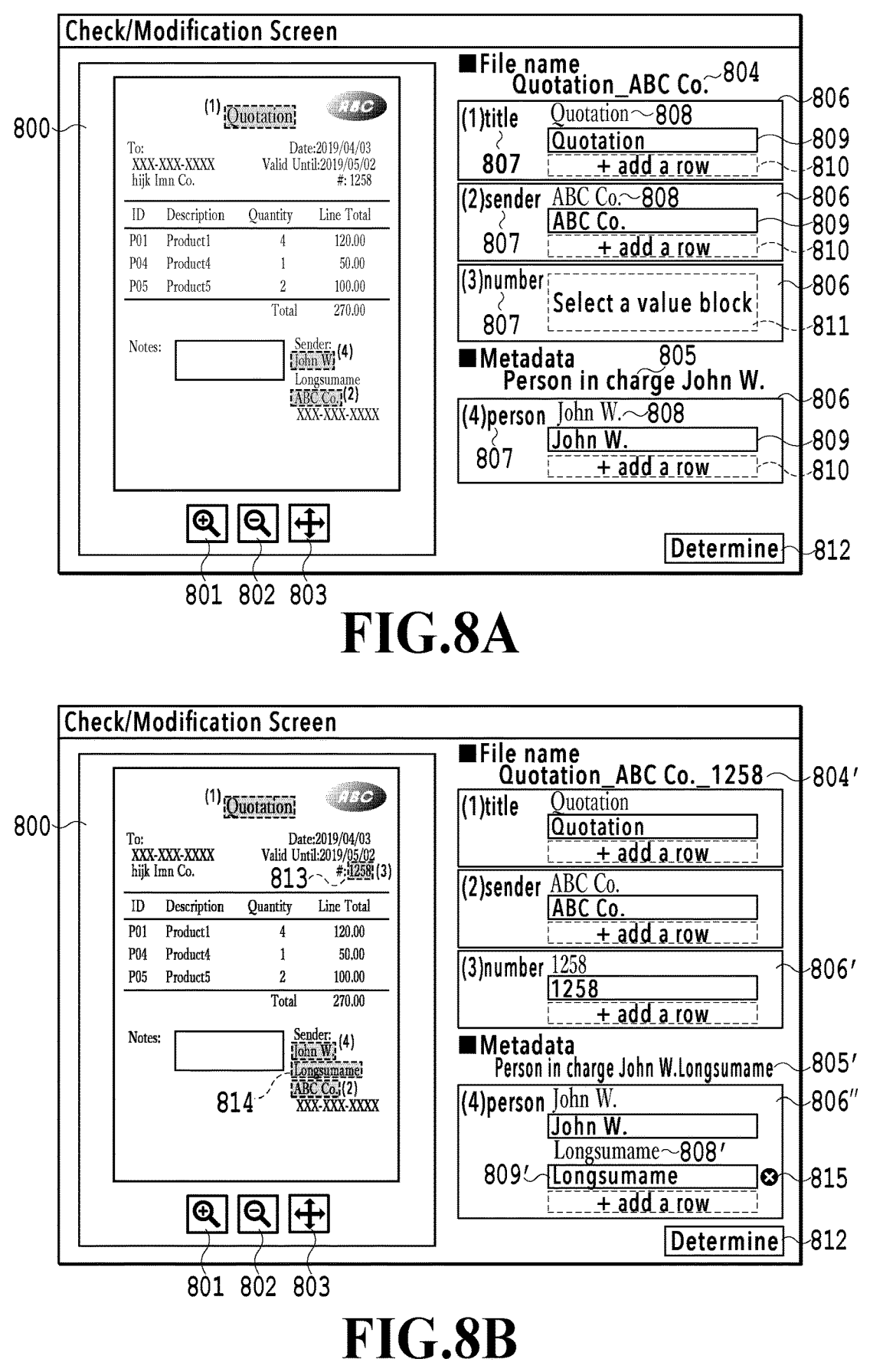

Following the above, the reception of check/modification (S402) by a user for the automatically generated file name and the like is explained in detail. FIG. 8A is an example of the check/modification screen that is displayed in a case where a registered document that matches the input document is identified and a value corresponding to the specific item is extracted in accordance with the value extraction rule associated with the registered document. In a preview area 800 on Check/Modification Screen in FIG. 8A, the scanned image of the input document is displayed as a preview image. Then, on the preview image, a rectangle indicating the position of the value block estimated at S507 is displayed in an overlapping manner. Buttons 801 and 802 are buttons for enlarging and reducing the display magnification of the preview image. A button 803 is a button for enlarging or reducing the preview image so that the preview image fits to the width or height of the preview area. In a File name field 804 and a Metadata field 805, a file name and metadata are displayed, respectively, which are generated by using a value extracted in accordance with the value extraction rule. In a value area 806, an item name 807 that is the target of value extraction, a partial preview area 808, a text field 809, and a button (row addition button) 810 for adding a row are displayed. In the partial preview area 808, an image corresponding to the value block estimated at S506, or an image corresponding to the value block selected on the preview area 800 by a user, which is partially cut out from the scanned image, is displayed. In the text field 809, OCR results corresponding to the value block are displayed. At this time, in a case where there is an error in the displayed OCR results, it is possible for a user to edit by a manual input. In a case where the value block estimation has failed, in the value area 806, the item name 807 is displayed but a message 811 prompting selection of a value block is displayed in place of the partial preview area 808, the text field 809, and the row addition button 810.

Next, a value block modification procedure by a user in a case where the estimated value block is erroneous, or in a case where the value block estimation has failed is explained. First, the user selects the modification-target value area 806. Following this, the user designates the correct value block in the preview area 800. At that time, in accordance with the designated value block, the partial preview area 808 and the text field 809 are updated. In a case where the message 811 is displayed, on a condition that the value block selection by the user is received, the partial preview area 808 and the text field 809 are displayed in place of the message 811. FIG. 8B shows the results of the user selecting a text block for the value area 806 of the item name {number} indicating the business form number on Check/Modification Screen in FIG. 8A. In this case, by designating a position 813 of the value block on the preview area 800, the display is updated as in a value area 806'.

Further, in a case where there is one as a value but the value block extends across a plurality of rows, the addition of a row is received by the row addition button 810. In order to add a row, it is sufficient to designate the correct value block on the preview area 800 after pressing down the row addition button 810. The state after adding a row for the value of the item name {person} indicating the person in charge on Check/Modification Screen in FIG. 8A is shown in FIG. 8B. By designating a value block 814 on the preview area 800 after pressing down the relevant row addition button 810, as in a value area 806", a preview area 808' and a text field 809' are added. Further, the display of the metadata field 805 is changed to that of a metadata field 805' and the metadata field 805 is displayed in the state where text corresponding to two rows is connected. In a case where the estimated value block extends across a plurality of rows, the partial preview area and the text filed, which correspond to a plurality of rows, are displayed from the beginning. Further, in the text field of the second and subsequent rows, a row deletion button 815 is displayed. By pressing down the row deletion button 815, it is possible to delete the preview area and the text field of the added row, and the relevant character string within the text field. After the deletion, the state returns to the state in FIG. 8A. The method of adding a row and the method of deleting a row are not limited to the above-described methods. For example, it may also be possible to receive the change in the vertical direction from a user by preparing a handler for deforming a rectangle in the vertical direction for the rectangle indicating the value block highlighted on the scanned image in an overlapping manner on the preview area 800. In this case, on a condition that instructions to perform deformation in the downward direction are given by the handler, a row is added so that the row is connected with the lower row. Further, in a case where a plurality of rows is already selected, on a condition that instructions to perform deformation in the upward direction are given, it may also be possible to receive deletion. Furthermore, at the time of receiving the addition of a row, it may also be possible to impose a constraint on the text block that can be added as a row by using information on the relative position with the already-selected block and the block size, or the existence on the scanned image, whether there is a change in the background color, or the like.

In a case where the registered document whose type is the same as that of the input document is not found at S401, the message 811 is displayed as in the case where it is not possible to identify the above-described value block area for all the values. Further, it is possible to newly designate each value block in accordance with the value block modification procedure described above.

A user having checked/modified the recommended file name and metadata presses down a Determine button 812. Due to this, the value, the file name, and the metadata for the scanned image of the input document are determined. The above is the contents of the processing to receive check/modification by a user for the automatically generated file name and the like.

<Updating/Registration Processing>

Figure 9:
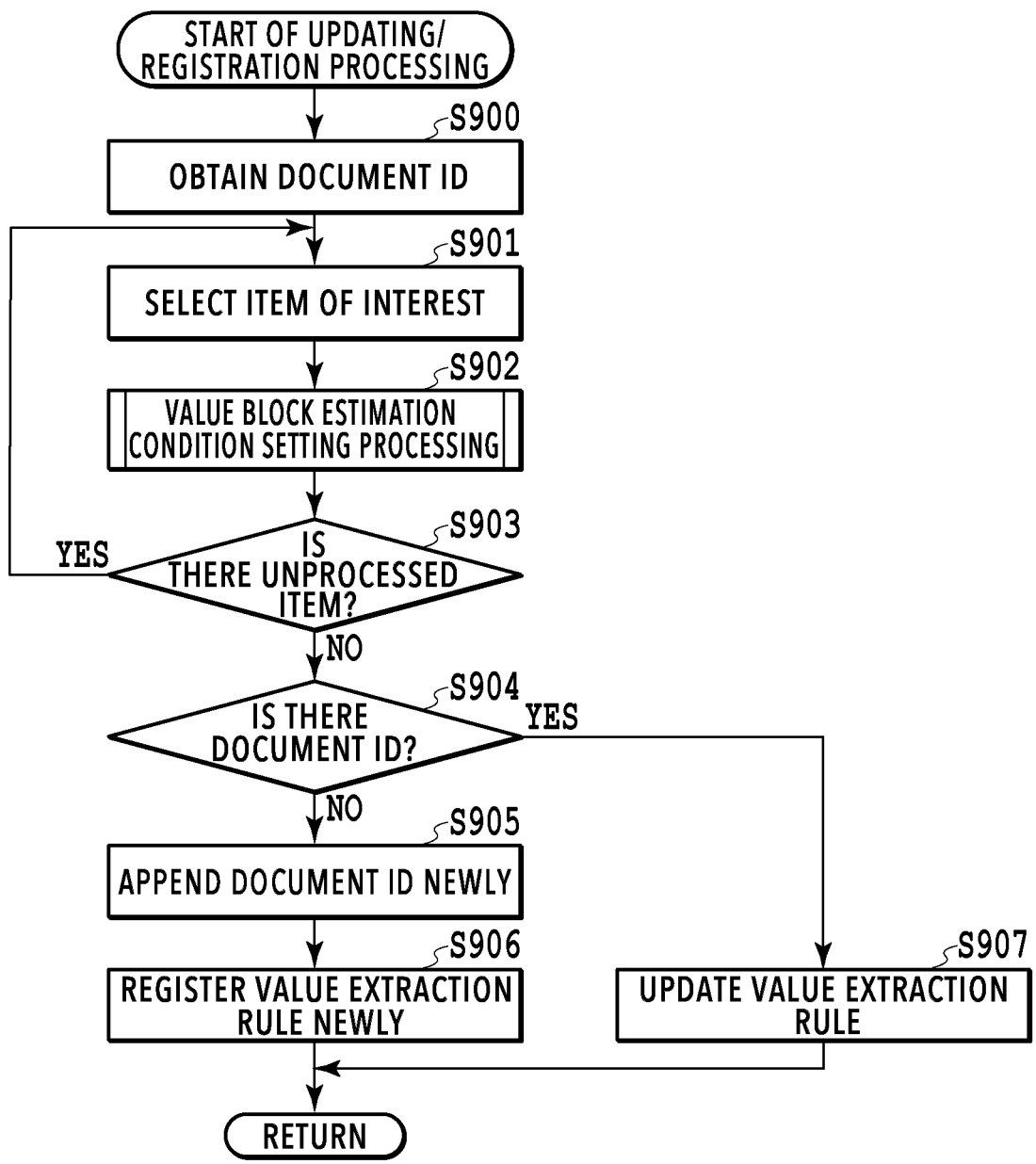
FIG. 9 is a flowchart showing details of updating/registration processing.

Following the above, with reference to the flowchart in FIG. 9, details of updating/registration processing (S403) by the image processing unit 305 are explained. In the updating/registration processing, processing to update the value extraction rule (overwrite registration) based on the input document and processing to newly register a value extraction rule (new registration) in a case where the input document is a document whose type is not registered yet are performed.

At S900, the document ID that is appended at S506 is obtained. In the document matching (S504), in a case where the matching of the input document with one of registered documents has succeeded, it is possible to obtain the document ID here, but in a case where the matching of the input document with any registered document has not succeeded, it is not possible to obtain the document ID.

At S901, from among each item corresponding to the value determined at S402, one item to which attention is paid as a processing target is selected. At S902 that follows, processing to set an estimation condition of the value block for the selected item of interest is performed. Details of the setting processing of the value block estimation condition, which is performed for the item of interest, will be described later.

At S903, whether the setting of the value block estimation condition is completed for each item of all the values determined at S402 is determined. In a case where the estimation condition of the value block is set for all the items, the processing advances to S904 and in a case where there is an unprocessed item, the processing returns to S901 and the same processing is repeated.

At S904, the next processing is divided in accordance with whether it is possible to obtain the document ID at S900. In a case where it is not possible to obtain the document ID, the processing advances to S905 and in a case where it is possible to obtain the document ID, the processing advances to S907.

At S905, a new document ID is issued and appended to the input document. At S906 that follows, a new value extraction rule that takes the input document as a new registered document is registered. Specifically, a new record in which the scanned image obtained at S400, the results of the value extraction processing at S401, and the value block estimation condition obtained at S902 are taken as "Document Image", "Document Identification Information", and "Value Information", respectively, is added to the rule table. As regards "Registered Name", a use inputs manually.

At S907, the value extraction rule corresponding to the document ID that has been obtained is updated. Specifically, a new value block estimation condition that takes into consideration the modification by a user for the recommended file name and the like is reflected in "Value Information" in the extraction rule.

<Setting Processing of Value Block Estimation Condition>

Figure 10:
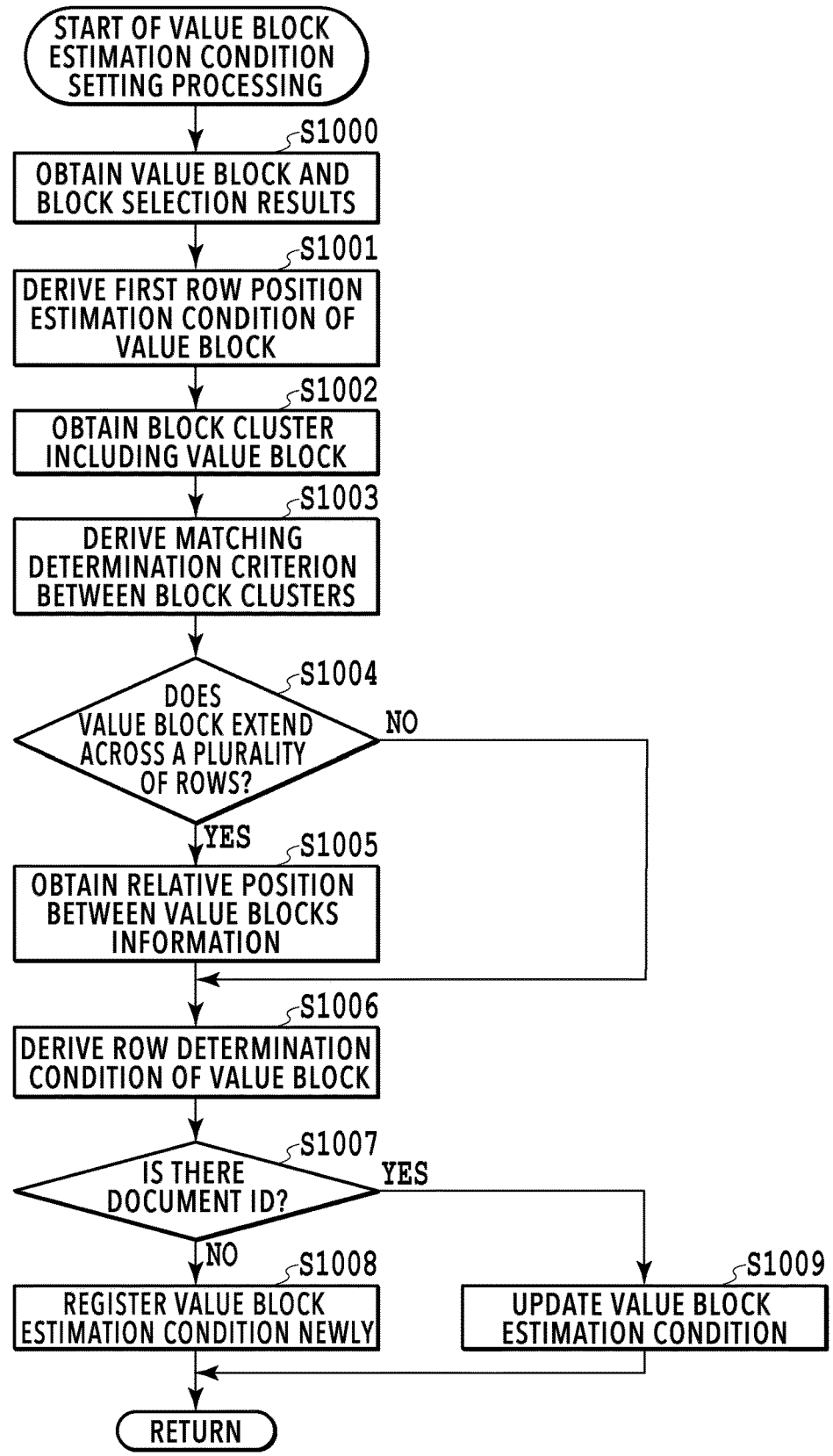
FIG. 10 is a flowchart showing details of value block estimation condition setting processing according to a first embodiment.

FIG. 10 is a flowchart showing details of the setting processing of the value block estimation condition (S902) according to the present embodiment. In this setting processing, the condition for estimating the value block of each value (in the following, described simply as "estimation condition") is obtained automatically based on the value determined by a user. The estimation condition that is obtained here is roughly divided into three configurations. The first is a condition for estimating the position of the first row of the value block (first row position estimation condition). The second is a condition for determining the value block with the same number of rows as that at the time of registration in a case where the estimated first row position and the row configuration therearound match those at the time of registration. The third is a condition for determining to which row from the row at the estimated first row position are taken as the value block (row determination condition) in a case where the estimated first row position and the row configuration therearound do not match those at the time of registration. By using the three conditions such as these as the estimation conditions, even in a case where the number of character string rows (number of value blocks) configuring the value corresponding to a certain item within the document changes, it is made possible to estimate the value block appropriately. In the following, how the estimation conditions are obtained by utilizing the value block determined by a user and the text block within the input image is explained with reference to a specific example in FIG. 11A to FIG. 11E.

Figures 11A, 11B, 11C, 11D, 11E:
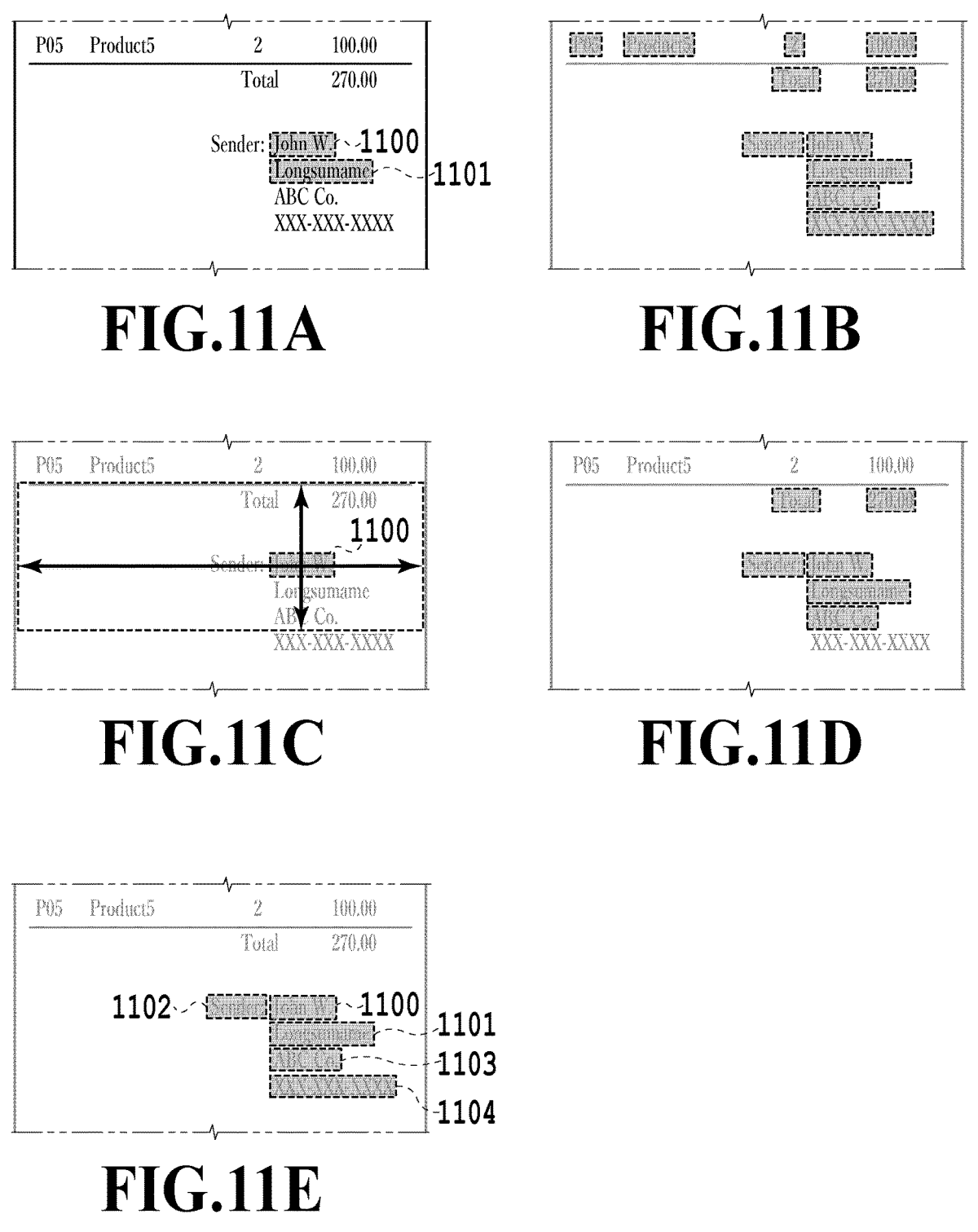

At S1000, the value block determined at S402 and all the text blocks obtained by the block selection processing at S502 are obtained. FIG. 11A is part (partial image) of the preview image 800 described previously and highlights value blocks 1100 and 1101 corresponding to two rows determined by a user as the text blocks for extracting the value of the item "Person in charge". FIG. 11B shows each text block in the same partial image as that in FIG. 11A by a broken-line rectangle.

At S1001, the first row position estimation condition of the value block is derived by using the value block and all the text blocks obtained at S1000. In the present embodiment, the comparison pattern that is used in the pattern matching method is derived as the first row position estimation condition. Specifically, among all the text blocks within the scanned image, a pattern including a set of peripheral text blocks in a predetermined range with the first row of the value block being taken as a reference is derived as the first row position estimation condition. FIG. 11C is a diagram showing the range of the pattern derived by taking the value block 1100 in FIG. 11A as a reference by thick arrows in the longitudinal direction and in the transverse direction and FIG. 11D is a diagram showing a text block group configuring the pattern. In a case of the pattern shown in FIG. 11C, the range is such that the entire width of the image is included in the X-direction (transverse direction) and the upper area and the lower area with the first row position of the value block being taken as a reference are qual in the Y-direction (longitudinal direction). However, the range of the pattern that is derived is not limited to this. For example, in a case where the value block extends across a plurality of rows, the layout of the portion on the lower side in the Y-direction of the value block changes frequently. Consequently, it may also be possible to derive the range as the pattern, which does not include the text block located on the lower side in the Y-direction of the value block. Further, the first row position estimation condition is not limited to one that presupposes the pattern matching. For example, a method is employed in which a character string that can be "key" in value extraction is searched for from the peripheral area on the left side or on the upper side of the determined value block and the first row position is estimated from the relative position to the text block of the key character string. In this case, it may also be possible to derive the key character string as the first row position estimation condition.

At S1002, a series of text blocks (in the following, called "block cluster") located under the value block in the scanned image is obtained. This block cluster is utilized to obtain a determination criterion for the determination of whether the estimated first row position and the row configuration therearound match the contents at the time of registration and the determination of to which row from the row at the estimated first row position are taken as the value block in the processing in the subsequent stages. Because of this, different from the comparison pattern of the pattern matching used for the estimation of the first row position, the text blocks are obtained so that the text block on the upper side, on the left side, or on the right side of the value block, which is a great distance apart from the value block, is not included and the features of the value block and the text blocks under the value block are captured. Here, the obtaining procedure is explained with reference to FIG. 11E. First, for the two value blocks 1100 and 1101, the text block that is determined to be in the same row as the row of each of the value blocks 1100 and 1101 is extracted. At this time, it may be possible to determine the text block to be in the same row, whose difference in the position in the height direction and in the Y-direction of the text block from the position of the target value block being taken as a reference is within a predetermined range and which exists within a predetermined range in the X-direction. Due to this, it is possible to extract the layout of the adjacent surroundings, not only the value block. In the example in FIG. 11E, as the text block in the same row as the row of the value block 1100 in the first row, a text block 1102 is extracted. Following this, by taking the value block in the lowermost row as a reference, a text block located at the closest position on the lower side in the Y-direction with the value block in the lowermost row being taken as a reference is searched for and whether to add the text block as part of the block cluster is determined. As the addition criteria at this time, mention is made of that the distance in the Y-direction is within a predetermined range, that the difference in the block height from the height of the value block is within a predetermined range, that no ruled line exits therebetween, that the foreground color and the background color are not different, and the like. In a case where these addition criteria are satisfied, the text block is added to the block cluster. Then, by repeating the search and the addition determination until there exits no text block that satisfies the addition criteria, the block cluster is obtained. In the example in FIG. 11E, by performing the search and the addition determination with the block 1101 being taken as a reference, which is in the second row, that is, the lowermost row of the two value blocks 1100 and 1101 determined by a user, text blocks 1103 and 1104 are included in the block cluster.

At S1003, by using the block cluster obtained at S1002, a criterion (in the following, described as "matching determination criterion") for determining the matching rate between the block clusters is derived. As the matching determination criterion, the feature amount in the downward direction (Y-direction) obtained from the block cluster, for example, the total number of rows (number of rows) configuring the block cluster, the height of each row included in the block cluster, or the interval between rows (interrow space distance) is utilized. By utilizing the feature amount in the Y-direction, which is obtained from the block cluster as described above, it is made possible to ascertain whether the row configuration of the surroundings including the value block does not change while allowing the variation of the text block in the X-direction accompanying the change in the described contents, which may occur in the document of the same type. The matching determination criterion is not limited to those described above. For example, it may also be possible to utilize the layout itself of the text block configuring the block cluster.

At S1004, the next processing is divided in accordance with whether the value block obtained at S1000 extends across a plurality of rows. In a case where the value block extends across a plurality of rows, the processing advances to S1005 and in a case where the value block does not extend across a plurality of rows (single row), the processing skips S1005 and advances to S1006.

Figure 13:
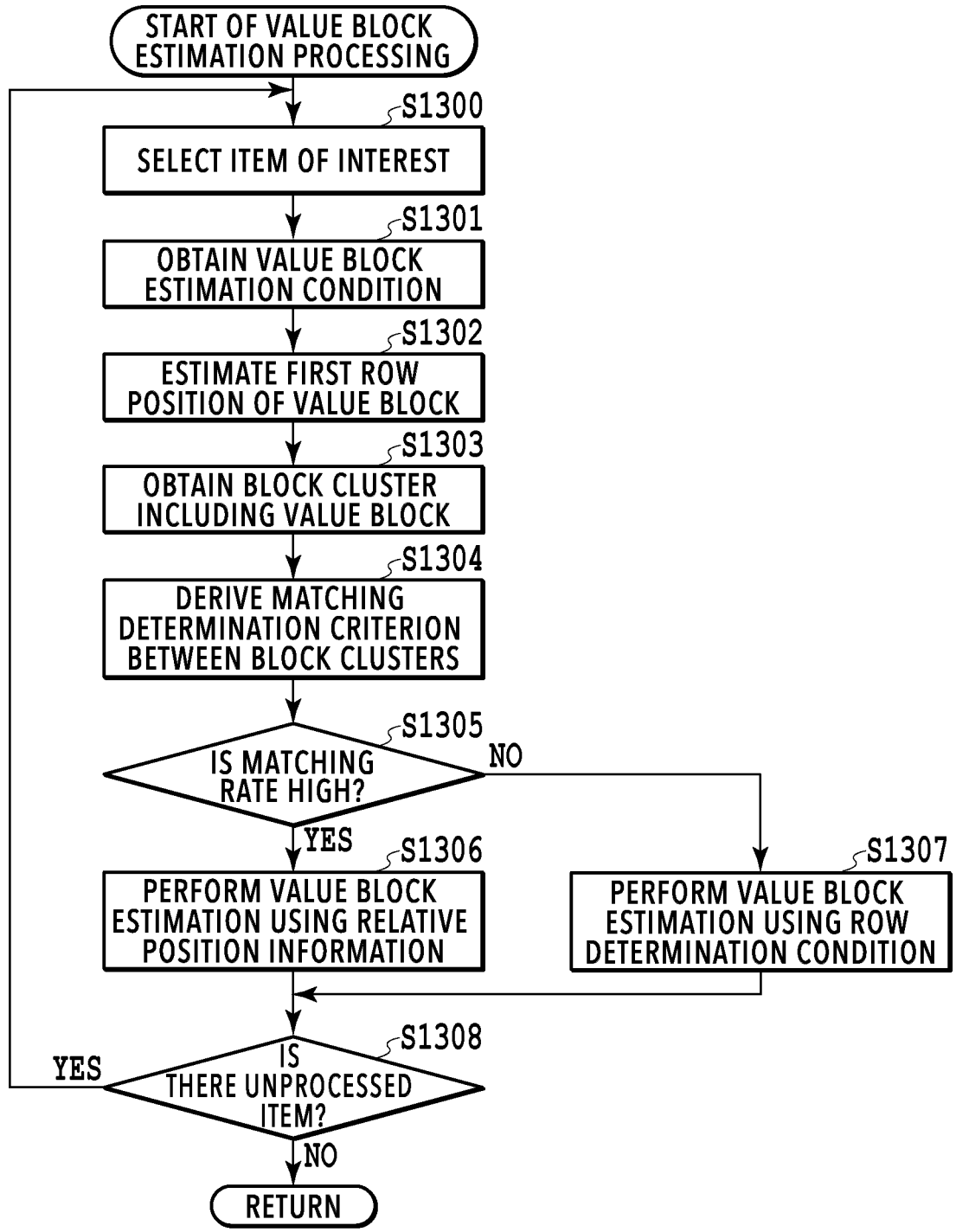
FIG. 13 is flowchart showing details of value block estimation processing.

At S1005, information (in the following, called "relative position information") indicating the relative position relationship between value blocks extending across a plurality of rows is obtained. This relative position information is utilized for determining the positions of the second and subsequent rows after estimating the first row position of the value block in the value block estimation processing (FIG. 13). Based on the matching determination criterion derived at S1003 and the relative position information obtained at this step, it is made possible to determine whether the estimated first row position and the row configuration therearound match those at the time of registration. Then, in a case where they match, it is made possible to determine the corresponding value block in the scanned image of the input document with the same number of rows as that at the time of registration.

At S1006, by using the block cluster obtained at S1002, the row determination condition is derived, which is the condition for determining to which text block in the row from the text block at the first row position are taken as the value block corresponding to the item of interest. As the row determination condition, those which utilize the interrow space distance, the row layout, the number of rows and the like are considered.

<<Condition Based on Interrow Space Distance>>

The derivation of the row determination condition utilizing the interrow space distance is explained with reference to a specific example. FIG. 12A shows a block cluster including two value blocks 1200 and 1201 determined by a user and two text blocks (in the following, called "other blocks") 1202 and 1203 other than the value block. In a case of the block cluster including the four blocks 1200 to 1203 shown in FIG. 12A, it is possible to obtain, as the interrow space distance, an interrow space T-T between the value blocks, an interrow space T-O between the value block in the lowermost row and the other block directly thereunder, and an interrow space O-O between the other blocks. As in this example, in a case where there is a difference between the interrow space T-T and the interrow space T-O, for example, it is possible to create the row determination condition, such as that the row is included in the value block rows until the interrow space equivalent to the interrow space T-O is detected. By constructing the condition (rule) such as this, it is made possible to estimate the value block correctly even in a case where the value block in the scanned image extends across the number of rows never determined in the past. In the example described above, the condition is that "the row is included in the value block rows until the interrow space equivalent to the interrow space T-O is detected", but in place of this, a rule that "the row is included in the value block rows as long as the interrow space equivalent to the interrow space T-T continues" may be accepted. Alternatively, the condition may be that both "the row is included in the value block rows until the interrow space equivalent to the interrow space T-O is detected" and "the row is included in the value block rows as long as the interrow space equivalent to the interrow space T-T continues" are satisfied (AND condition).

<<Condition Based on Row Layout>>

In a case of the row determination condition utilizing the row layout, the layout of the row including another block immediately under the value block in the lowermost row is used. For example, it is possible to construct a condition (rule) that the rows immediately above the row whose matching rate with the row layout including another block is high are determined as the value blocks.

<<Condition Based on Number of Rows>>

In a case of the row determination condition utilizing the number of rows, for example, information on the number of rows of other blocks located under the value block at the time of a user determining the value block is retained in advance. Then, by using the retained information, it is possible to construct a condition (rule) that "the number of rows obtained by subtracting 'the number of rows of other blocks located under the value block' from 'the total number of rows of the block cluster' is determined as the rows of the value block".

It may also be possible to take, as the row determination condition, the combination of <<condition based on interrow space distance>>, <<condition based on row layout>>, and <<condition based on number of rows>> described above. For example, in a case where the value block is not determined by <<condition based on interrow space distance>>, next, <<condition based on row layout>> is applied, and in a case where the value block is not determined, <<condition based on number rows>> is applied.

At S1007, whether the document ID of the input document is obtained is determined. In a case where the document ID is not obtained at S900 of the updating/registration processing (FIG. 9) described previously, the processing advances to S1008 and in a case where the document ID is obtained, the processing advances to S1009.

At S1008, by using the first row position estimation condition, the matching determination criterion, the relative position between value blocks information, and the row determination condition, which are derived/obtained at S1001 to S1006, a value block estimation condition is registered newly.

At S1009, by using the first row position estimation condition, the matching determination criterion, the relative position between value blocks information, and the row determination condition, which are derived/obtained at S1001 to S1006, the value block estimation condition is updated. As the updating method, it is sufficient to compare the matching determination criterion derived at S1003 and the registered matching determination criterion and retain as another value block estimation condition in the item of interest in a case where the contents do not match. By retaining the value block estimation condition separately from the already-existing one, the number of cases increases where the same row configuration as that of those determined in the past is found at the time of the value extraction of the input document, and therefore, it is made possible to perform value extraction with a higher accuracy. Even in a case where the results of performing the comparison with the registered matching determination criterion indicate that the contents do not match, it is not necessary to retain all of the first row position estimation condition, the matching determination criterion, the relative position between value blocks information, and the row determination condition separately. For example, at the time of value extraction, in a case where the position estimated by using the registered first row position estimation condition and the first row position determined by a user are the same and it is determined that the first row position can be estimated correctly, it may also be possible to retain the first row position estimation condition in common.

The above is the contents of the value block estimation condition setting processing. At the time of updating (S1009), it may also be possible to retain the frequency of use and the time stamp for each value block estimation condition. For example, in a case of the matching determination criterion that does not use the OCR character string, it may happen that the value block estimation condition matches a plurality of registered matching determination criteria at the time of value extraction, and therefore, it is not possible to determine which value block estimation condition to apply. In the case such as that, by giving priority to the estimation condition whose frequency of use is the highest or the estimation condition whose time stamp is the most recent, it is possible to improve the value extraction accuracy.

<Value Block Estimation Processing>

FIG. 13 is a flowchart showing details of the value block estimation processing (S507) according to the present embodiment. In this value block estimation processing, the value block is estimated by using the estimation condition that is set in the flow in FIG. 10 described previously.

At S1300, based on the value extraction rule obtained at S503, one item to which attention is paid as a processing target is selected. At S1301 that follows, based on the value extraction rule obtained at S503, the value block estimation condition corresponding to the item of interest selected at S1300 is obtained. In this value block estimation condition, as described above, the first row position estimation condition, the matching determination criterion between block clusters, the relative position between value blocks information, and the row determination condition are included.

At S1302, by using the first row position estimation condition in the value block estimation condition obtained at S1301, the first row position of the text block corresponding to the item of interest is estimated.

At S1303, by taking the first row position estimated at S1302 as a reference, the block cluster relating to the item of interest is obtained. The block cluster obtaining procedure here is the same as that at S1002 in the value block estimation condition setting processing (FIG. 10) described previously.

At S1304, for the block cluster obtained at S1303, the matching rate with the block cluster in the registered document is determined by using the matching determination criterion in the value block estimation condition obtained at S1301. Here, for example, in a case where the number of rows is employed as the matching determination criterion, it is determined that the matching rate is high on a condition that the total numbers of text blocks constituting both block clusters perfectly match. Further, it may also be possible to perform the determination by turning the matching rate into a numerical value for evaluation and using a threshold value determined in advance.

At S1305, the next processing is divided in accordance with the results of the matching rate determination at S1304. In a case where the determination results indicate that the matching rate is high, the processing advances to S1306 and in a case where the matching rate is not high, the processing advances to S1307.

At S1306, by taking the first row position estimated at S1302 as a reference, the value block corresponding to the item of interest is determined by using the relative position information in the value block estimation condition obtained at S1301. That is, the value block of the item of interest is determined by determining the positions of the second and subsequent rows for the block cluster obtained at S1303, which has the same row configuration as that of the matched registered document, by taking the first row position estimated at S1302 as a reference. Due to this, in a case where the first row position of the value block and the row configuration therearound match those at the time of a user determining the value in the past, it is made possible to extract the value with the same number of rows as that at the time of registration.

At S1307, by taking the first row position estimated at S1302 as a reference, the value block corresponding to the item of interest is determined by using the row determination condition in the value block estimation condition obtained at S1301. That is, whether each text block located under the first row position estimated at S1302 is included in the value block is determined in accordance with the row determination condition for the block cluster obtained at S1303, which has the row configuration different from that of the matched registered document. FIG. 12B and FIG. 12C each show a specific example in which the value block is determined by the row determination condition derived from the block cluster in FIG. 12A for the block cluster determined not to match by the matching rate determination. In the example in FIG. 12B, first, the row determination of whether to take a text block 1208 as the value block is determined, which located immediately under the position of a text block 1207 that is estimated as the first row position. Then, an interrow space 1209 is equivalent to the interrow space T-O, and therefore, only the text block 1207 is determined to be the value block. Further, in the example in FIG. 12C, first, the row determination by taking the position of a text block 1210 estimated as the first row position as a reference, that is, the comparison between each of an interrow space 1214, an interrow space 1215, and an interrow space 1216, and the interrow space T-O is performed. Then, the interrow space 1216 is equivalent to the interrow space T-O, and therefore, three text blocks, that is, the text block 1210 and text blocks 1211 and 1212 are determined to be the value block and a text block 1213 is determined to be another block.

At 51308, whether the value block estimation of all the items included in the value extraction rule obtained at S503 is completed is determined. In a case where there is an unprocessed item, the processing returns to S1300, and the next item of interest is determined and the processing is continued. On the other hand, in a case where the value block estimation is completed for all the values, this processing is terminated. The above is the contents of the value block estimation processing.

As explained above, in the present embodiment, the value block estimation condition is obtained automatically based on the value determined by a user and updated or registered newly as needed. Due to this, it is possible for a user to estimate the value block accurately without the need to set the estimation condition individually for the character string row of the value, which may be described across a plurality of rows, and as a result, it is possible to extract the value with a high accuracy.

Second Embodiment

In the first embodiment, the aspect is explained in which the value block estimation condition is derived for each item of the value desired to be extracted and the value block estimation is performed. However, for example, depending on the type of business form, there exists a case where value blocks corresponding to different items respectively are close to one another. Consequently, an aspect is explained as the second embodiment in which in a case where there is a plurality of items of the values desired to be extracted and they are close to one another, the estimation of the value block of the item of interest is performed by utilizing the estimation results of the first row position of the value block of another item. Explanation of the contents common to those of the first embodiment is omitted and in the following, different points are explained mainly.

<Setting Processing of Value Block Estimation Condition>

Figure 14:
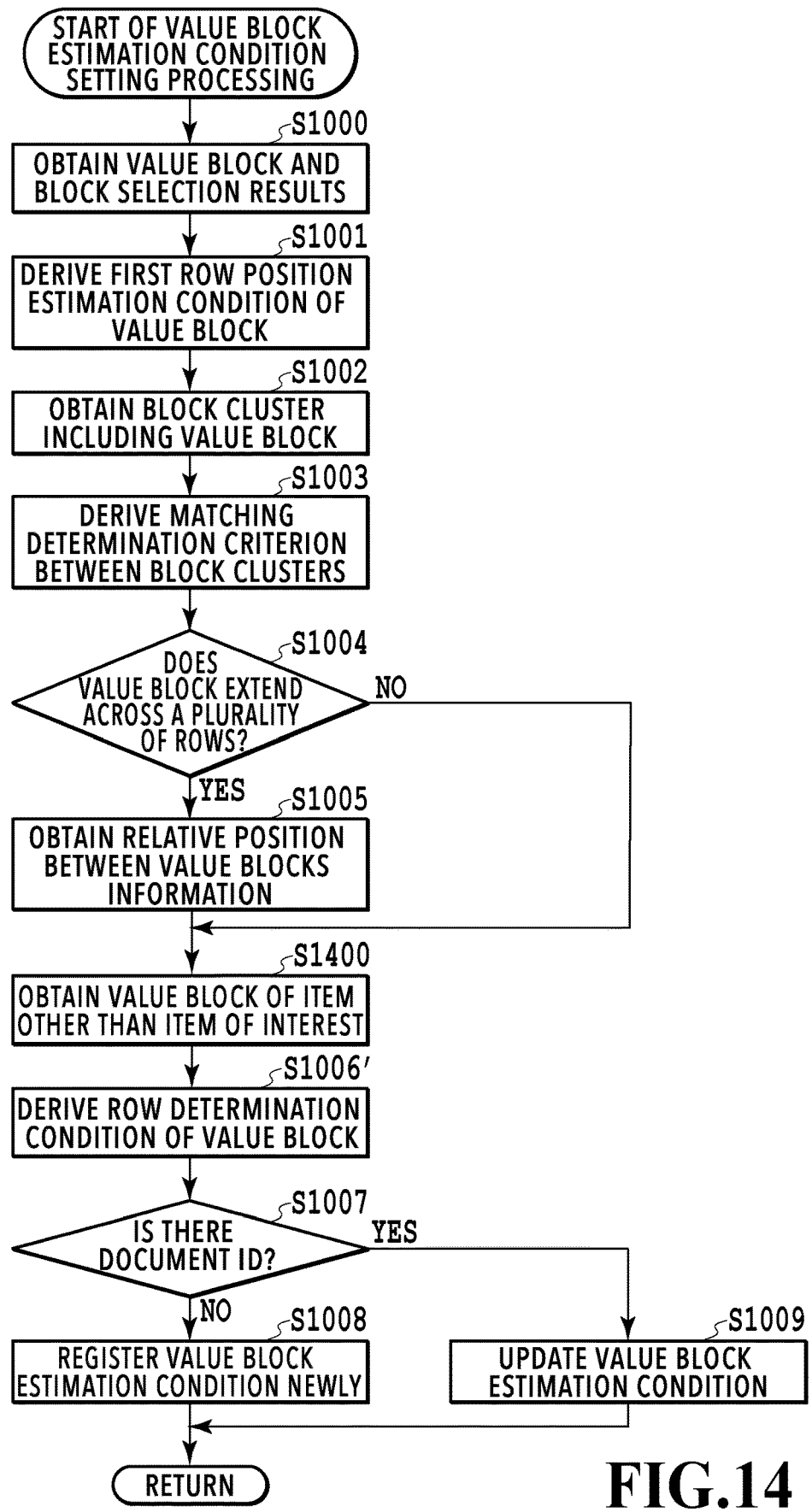
FIG. 14 is a flowchart showing details of value block estimation condition setting processing according to a second embodiment.

FIG. 14 is a flowchart showing details of the setting processing (S902) of the value block estimation condition according to the present embodiment. In the following, the difference from the flowchart shown in FIG. 10 is explained.

At S1400, the value block determined by a user at S402 of an item (in the following, described as "another item") other than the item of interest selected at S901 is obtained.

At S1006', by using the value block of the other item obtained at S1400, the row determination condition of the item of interest is derived. Here, the derivation of the row determination condition based on the value block of the other item in the present embodiment is explained with reference to a specific example. In FIG. 15A, two text blocks 1500 and 1501 are value blocks determined by a user, which corresponds to the item name {person} of "Person in charge" as the item of interest. Further, a text block 1502 is a value block corresponding to the item name {sender} of "Company name" as the other item and obtained at S1400. As in this example, in a case where there exists no extra text block between the value block 1501 in the lowermost row of the value block corresponding to the item of interest and the value block 1502 corresponding to the other item, it is possible to construct a rule, for example, as follows. Specifically, it is possible to derive the row determination condition that the value block of the item of interest is determined by taking the first row of the value block corresponding to the item of interest as the starting point row and taking the row immediately above the first row of the value block corresponding to the other item as the endpoint row.

<Value Block Estimation Processing>

Figure 16:
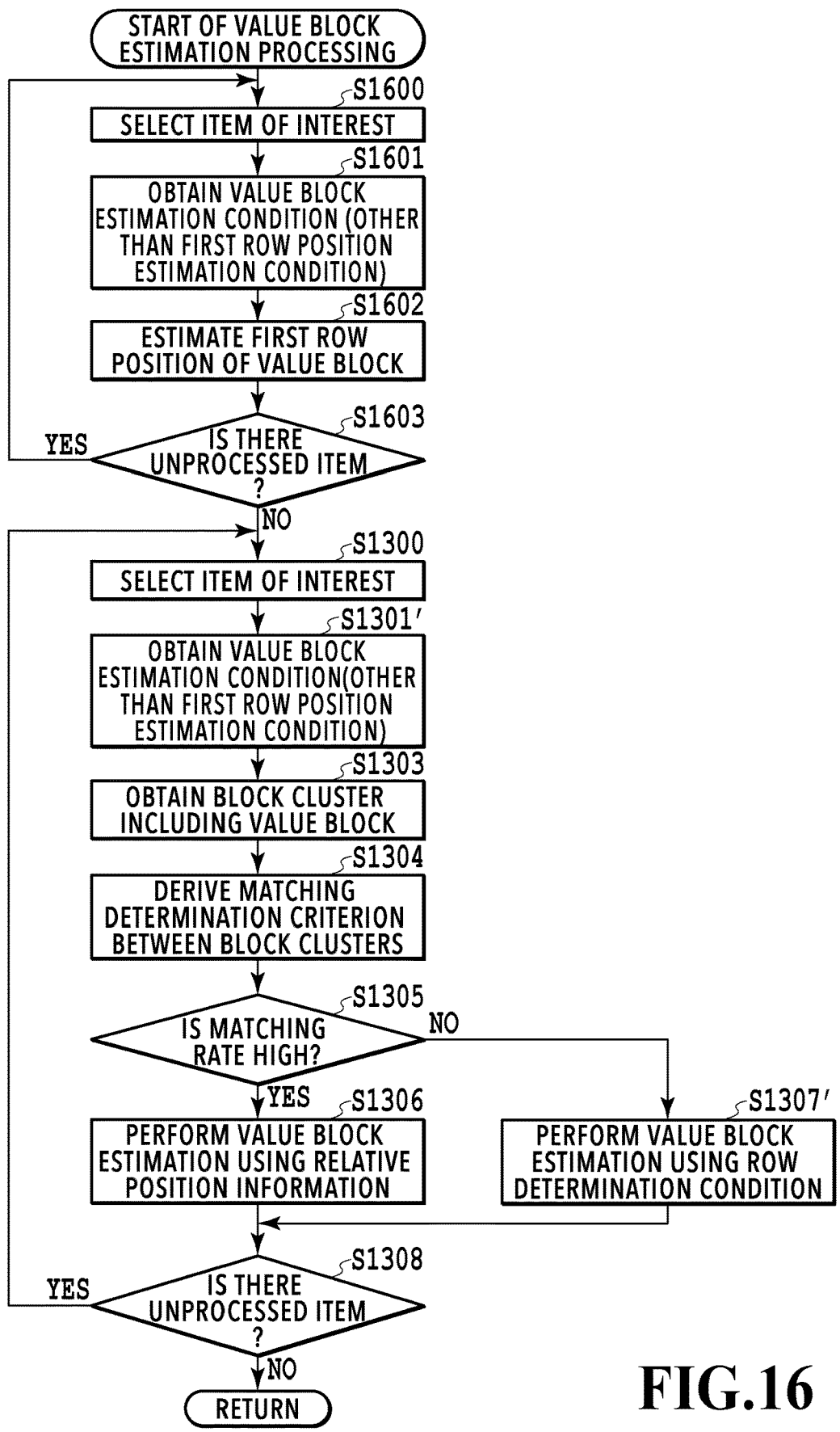
FIG. 16 is a flowchart showing details of value block estimation processing according to the second embodiment.

FIG. 16 is a flowchart showing details of the value block estimation processing (S507) according to the present embodiment. In the flow in FIG. 13 according to the first embodiment, all the processing in the value block estimation is performed independently for each item included in the value extraction rule, but in the present embodiment, the first row position of the value block is estimated in advance for all the items. In the following, the difference from the flowchart in FIG. 13 is explained.

At S1600, from among the value extraction rule obtained at S503, one processing-target item to which attention is paid is selected. At S1601 that follows, based on the value extraction rule obtained at S503, the value block estimation condition corresponding to the item of interest selected at S1600 is obtained. In a case of the value block estimation condition that is obtained at this step, on a condition that the first row position estimation condition is included, this is enough and the other conditions (rules) may not be included.

At S1602, by using the first row position estimation condition obtained at S1601, the first row position of the text block corresponding to the item of interest is estimated. The procedure of the estimation processing is the same as that at S1302 in the flow in FIG. 13.

At S1603, whether the estimation of the first row position of the value block for all the items included in the value extraction rule obtained at S503 is completed is determined. In a case where there is an unprocessed item, the processing returns to S1600, and the next item of interest is determined and the processing is continued. On the other hand, in a case where the estimation of the first row position of the value block for all the items is completed, the processing advances to S1300.

At S1301', the value block estimation condition corresponding to the item of interest selected at S1300 is obtained. In a case of the value block estimation condition that is obtained at this step, on a condition that the matching determination criterion between block clusters, the relative position between value blocks information, and the row determination condition are included, this is enough and the first row position estimation condition may not be included. Further, in the row determination condition, not only the value block estimation condition that is set in the flow in FIG. 10 described previously but also the value block estimation condition that is set in the flow in FIG. 14 described previously is included.

At S1307', by using the row determination condition obtained at S1301', the value block corresponding to the item of interest is determined. At this time, in a case where the condition that utilizes the first row position of the value block of the other item is included in the obtained row determination condition, the value block of the item of interest is estimated with reference to the first row position of the other item already estimated at S1602. FIG. 15B and FIG. 15C each show a specific example in which the value block is determined by the row determination condition derived from the block cluster in FIG. 15A for the block cluster determined not to match (No at S1305) by the matching rate determination. In the example in FIG. 15B, a text block 1503 is estimated as the first row position of the value block corresponding to the item name {person} representing "Person in charge", and in the example in FIG. 15C, three text blocks 1505 to 1507 are estimated similarly. Further, in the example in FIG. 15B, a text block 1504 is estimated as the first row position of the value block corresponding to the item name {sender} representing "Company name" and in the example in FIG. 15C, a text block 1508 is estimated similarly. Here, the row determination condition is applied that takes the rows starting from the first row position of the item of interest (here, the item name {person}) until the row immediately above the first row position of the other item (here, the item name {sender}) as the value blocks. Due to this, in the example in FIG. 15B, it is possible to estimate only the text block 1503 as the value block corresponding to the item of interest. Further, in the example in FIG. 15C, it is possible to estimate the three text clocks 1505 to 1507 as the value blocks corresponding to the item of interest.

As above, according to the present embodiment, in a case where there is a plurality of items of a value that is desired to be extracted and the items are close to one another, the estimation of the value block of the item of interest is performed by utilizing the estimation results of the first row position of the value block of another item. Due to this, it is possible to further improve the estimation accuracy of the value block.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, even in a case where the character string row of a value corresponding to a certain item within a document changes, it is possible to extract the value with a high accuracy without imposing a heavy burden on a user.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-028314, filed Feb. 25, 2022 which is hereby incorporated by reference wherein in its entirety.

What is claimed is:

1. An image processing apparatus comprising:
one or more memories storing instructions; and
one or more processors executing the instructions to:
obtain a scanned image obtained by scanning an input document;
extract a character string by estimating a text block corresponding to the character string from among text blocks included in the scanned image based on a rule of a registered document whose type is the same as that of the input document, which is included in information in which the rule for extracting a character string corresponding to a specific item within a document is registered for each type of document;
receive modification by a user for the text block corresponding to the extracted character string; and
derive a condition for the estimation capable of estimating contents after the modification as a text block corresponding to the character string.

2. The image processing apparatus according to claim 1, wherein
in the condition for the estimation, a first condition for estimating a first row position of a text block corresponding to the character string in the scanned image is included.

3. The image processing apparatus according to claim 2, wherein
the first row position is estimated by a method of pattern matching and
the first condition is a comparison pattern that is used in the method of pattern matching and is a pattern consisting of a set of peripheral text blocks within a predetermined range with the first row of the text block corresponding to the character string being taken as a reference among all text blocks within the scanned image.

4. The image processing apparatus according to claim 2, wherein
in the condition for the estimation, a second condition is further included, which is for determining to which row from the row at the first row position estimated by the first condition are taken as text blocks corresponding to the character string in a case where a row configuration of the text blocks corresponding to the character string in the scanned image does not match a row configuration of the text blocks corresponding to the character string specified in the rule of the registered document.

5. The image processing apparatus according to claim 4, wherein
whether the row configuration of the text blocks corresponding to the character string in the scanned image matches the row configuration of the text blocks corresponding to the character string specified in the rule of the registered document is determined by comparing the text blocks corresponding to the character string and a block cluster including other text blocks located in the downward direction.

6. The image processing apparatus according to claim 5, wherein
the determination is performed by using a feature amount in the downward direction obtained from the block cluster.

7. The image processing apparatus according to claim 6, wherein
the feature amount in the downward direction is one of a number of rows configuring the block cluster, a row height, an interrow space distance, and a layout of each text block configuring the block cluster.

8. The image processing apparatus according to claim 5, wherein
the second condition is a condition that takes, as a reference, one of a distance between rows configuring the block cluster, a number of rows, and a row layout, or a combination thereof.

9. The image processing apparatus according to claim 5, wherein
the second condition is a condition that takes a first row position of a value block corresponding to an item other than the specific item as a reference.

10. The image processing apparatus according to claim 1, wherein
the one or more processors further execute the instructions to:
further update the rule used for the extraction so that a condition for the estimation compatible with the derived modified text block is included.

11. An image processing method comprising the steps of:
obtaining a scanned image obtained by scanning an input document;
extracting a character string by estimating a text block corresponding to the character string from among text blocks included in the scanned image based on a rule of a registered document whose type is the same as that of the input document, which is included in information in which the rule for extracting a character string corresponding to a specific item within a document is registered for each type of document;
receiving modification by a user for the text block corresponding to the extracted character string; and
deriving a condition for the estimation capable of estimating contents after the modification as a text block corresponding to the character string.

12. A non-transitory computer readable storage medium storing a program for causing a computer to perform an image processing method comprising the steps of:
obtaining a scanned image obtained by scanning an input document;

extracting a character string by estimating a text block corresponding to the character string from among text blocks included in the scanned image based on a rule of a registered document whose type is the same as that of the input document, which is included in information in which the rule for extracting a character string corresponding to a specific item within a document is registered for each type of document;

receiving modification by a user for the text block corresponding to the extracted character string; and deriving a condition for the estimation capable of estimating contents after the modification as a text block corresponding to the character string.

* * * * *